US007139281B1

(12) United States Patent
Bodin

(10) Patent No.: US 7,139,281 B1
(45) Date of Patent: Nov. 21, 2006

(54) METHOD, SYSTEM AND ROUTER PROVIDING ACTIVE QUEUE MANAGEMENT IN PACKET TRANSMISSION SYSTEMS

(75) Inventor: Ulf Bodin, Lulea (SE)

(73) Assignee: Teliasonera AB, Farsta (SE)

( * ) Notice: Subject to any disclaimer, the term of this patent is extended or adjusted under 35 U.S.C. 154(b) by 0 days.

(21) Appl. No.: 09/926,280

(22) PCT Filed: Apr. 7, 2000

(86) PCT No.: PCT/SE00/00665

§ 371 (c)(1),
(2), (4) Date: Jan. 9, 2002

(87) PCT Pub. No.: WO00/60817

PCT Pub. Date: Oct. 12, 2000

(30) Foreign Application Priority Data

Apr. 7, 1999 (SE) .................................. 9901236

(51) Int. Cl.
*H04L 12/28* (2006.01)
*H04L 12/56* (2006.01)
(52) U.S. Cl. ........................................ 370/412; 370/252
(58) Field of Classification Search ................. None
See application file for complete search history.

(56) References Cited

U.S. PATENT DOCUMENTS 5,546,389 A 8/1996 Wippenbeck et al.

6,252,848 B1 * 6/2001 Skirmont .................... 370/229

FOREIGN PATENT DOCUMENTS

EP 0 872 988 10/1998
WO WO 96/29804 9/1996

OTHER PUBLICATIONS

Anindya Basu, A comparative Study of Schemes for Differentiated Services, 1998, CiteSeer.IST, 1-23.*
Technical Specification from Cisco, "Distributed Weighted Random Early Detection", 1998.
D. Clard, et al., "Explicit Allocation of Best Effort Delivery Service", 1997 (a copy will be furnished later).
M. Parris, et al., Multimedia Computing and Networking, vol. 3654, "Lightweight Active Router-Queque Management for Multimedia Networking", 1999.

* cited by examiner

*Primary Examiner*—Steven Nguyen
(74) *Attorney, Agent, or Firm*—Oblon, Spivak, McClelland, Maier & Neustadt, P.C.

(57) ABSTRACT

A method of active queue management, for handling prioritized traffic in a packet transmission system, the method including: providing differentiation between traffic originating from rate adaptive applications that respond to packet loss, wherein traffic is assigned to one of at least two drop precedent levels in-profile and out-profile; preventing starvation of low prioritized traffic; preserving a strict hierarchy among precedence levels; providing absolute differentiation of traffic; and reclassifying a packet of the traffic of the packet transmission system, tagged as in-profile, as out-profile, when a drop probability assigned to the packet is greater than a drop probability calculated from an average queue length for in-profile packets.

25 Claims, 12 Drawing Sheets

```
for each packet arrival
    calculate avg_ql
    if avg_ql > max_th
        drop this packet
    if it is a packet marked as in profile
        calculate avg_ql_in
        if avg_ql_in > th_in
            If min_th_in < avg_ql
                calculate probability Pin;
                with Pin drop this packet
    if it is a packet marked as out of profile
        if min_th_out < avg_ql
            Calculate probability Pout
            With Pout drop this packet
```

FIGURE 7

| Bandwidth allocations with LtRIO | | | | | | |
|---|---|---|---|---|---|---|
| th_in/max_th | ½ | | | ¾ | | |
| Flows with non-zero profiles (%) | 30 | 40 | 50 | 30 | 40 | 50 |
| Maximum load (Mbps) | 14.04 | 13.13 | 14.35 | 22.13 | 24.11 | 22.13 |
| (% of link speed) | 46.8 | 43.8 | 47.8 | 73.8 | 80.4 | 73.8 |

FIGURE 9

METHOD, SYSTEM AND ROUTER PROVIDING ACTIVE QUEUE MANAGEMENT IN PACKET TRANSMISSION SYSTEMS

CROSS-REFERENCE TO RELATED APPLICATIONS

This application claims priority to the International Application PCT/SE00/00665 filed on Apr. 7, 2000, which claims priority to the Swedish Patent Application with the Serial Number 9901236-1, filed on Apr. 7, 1999.

BACKGROUND OF THE INVENTION (1) Field of the Invention

The present invention relates to methods of active queue management in packet transmission systems, especially internet systems, telecommunications systems employing such methods and routers employing such methods.

(2) Description of the Related Art

The current Internet architecture offers one service only, namely, best-effort. The Internet community has recognized the importance of simplicity in the forwarding mechanisms, but has also recognized that this single service may not be enough to support the wide range of applications on the Internet. The Internet Engineering Task Force (IETF) is, therefore, designing architectural extensions to enable service differentiation on the Internet. The Differentiated Services (DiffServ) architecture, see:

Black D. et. al. (1998), An Architecture for Differentiated Services, IETF RFC 2475, December 1998;

Bernet Y. et. al. (1998), A Framework for Differentiated Services, IETF DRAFT, October 1998; and Nichols K. et. al. (1998), Definition of the Differentiated Services Field (DS Field) in the IPv4 and 1Fv6 Headers, IETF RFC 2474, December 1998;

includes mechanisms for differentiated forwarding.

One proposed mechanism for DiffServ is to assign levels of drop precedence to IP packets. This mechanism is included in the Assured Forwarding (AF) per-hop behavior (PHB) group, see:

Hainanen J. et. al. (1998), Assured Forwarding PHB Group, IETF DRAFT, November 1998.

AF can be used to offer differentiation among rate adaptive applications that respond to packet loss, e.g., applications using TCP. The traffic of each user is tagged as being in, or out of, their service profiles. Packets tagged as in profile are assigned a lower drop precedence than those tagged as out of profile. In addition, a packet within a users profile can be tagged with one, out of several levels, of drop precedence. For now, there are three levels of drop precedence for the AF PHB group.

Multiple levels of drop precedence can be created with an active queue management (AQM) mechanism applied to a FIFO queue. An advantageous property of FIFO queues is that packets are forwarded in the same order as they arrive. Thus, packet reordering, which can reduce the performance of a TCP connection, is avoided. Moreover, FIFO queues are suitable for high-speed links since they can be implemented efficiently.

Two known AQM mechanisms are RIO, see:

Clark D. and Fang W. (1997), Explicit Allocation of Best Effort Delivery Service, 1997 URL http://www.diffserv.lcs.mit.edu/Papers/exp-alloc-ddc-wf.pdf, and WRED, see:

Technical Specification from Cisco (1998), Distributed Weighted Random Early Detection, 1998, URL: http://www.cisco.comlunivercd/cc/td/doc/productl/oftware/ios/111/cc111/wred.pdf;

Normally, prioritized traffic entering a network is controlled to avoid overload. When such traffic is properly controlled, RIO and WRED are found to offer an absolute quantifiable differentiation. However, these mechanisms can cause starvation of less prioritized traffic if this control fails. That is, traffic tagged with anything but the highest prioritized level of drop precedence may suffer from starvation.

Failures in traffic control will occur due to inaccuracies in admission control and topology changes. For example, measurement based admission control may accidentally accept traffic causing a temporary overload until this condition is detected. Moreover, the control system, or the signalling protocol, may fail in adapting fast enough to changes in network routing topology. Traffic conditioners may, therefore, not be reconfigured before overload occurs. Thus, it is preferable if the AQM mechanism used can prevent starvation at any load.

RIO can be configured to prevent starvation, but a strict hierarchy among precedence levels cannot be guaranteed under periods of overload. That is, traffic tagged with the highest prioritized level of drop precedence may experience a larger drop rate than traffic tagged with a lesser prioritized level. Such a configuration of RIO is, therefore, not advisable. A queuing mechanism should not only prevent starvation, it should also preserve a strict hierarchy among precedence levels at any load.

A queuing mechanism creating multiple levels of drop precedence can be considered to be load-tolerant if it can meet the following two requirements at any load:

prevent starvation of low prioritized traffic—that is, low prioritized traffic must always get a useful share of the bandwidth available; and preserve a strict hierarchy among precedence levels—that is, traffic using a certain precedence level must always experience less probability of loss than traffic using a less prioritized level of drop precedence.

WRED can meet these requirements for load-tolerance when configured to offer a relative differentiation. A relative differentiation means, for example, that a TCP flow is given twice the throughput of another, less prioritized, TCP flow with the same RTT. That is, guarantees are made to one flow, only, relatively to another. An absolute differentiation, on the other hand, offers quantifiable bounds on throughput, loss and/or delay jitter. This kind of differentiation can give a TCP flow an absolute quantified throughput independent of the throughput other TCP flows will experience.

It can be assumed that absolute differentiable services are more desireable for many users than relative services, since they are more predictable. With an absolute service, the quality of a certain communication session is known in advance. This pre-knowledge is, for example, valuable when choosing the optimal level of redundancy coding. With a relative service, the level of coding has to be chosen based on heuristics, or real-time measurements.

Neither RIO, nor WRED, can meet the requirements for load-tolerance, stated above, while providing an absolute differentiation. The present invention, however, provides a new queuing mechanism, WRED with Thresholds (WRT). The benefit of the present invention, i.e. WRT, is that, without reconfiguration, it provides an absolute differentiation, if prioritized traffic is properly controlled, and a relative differentiation in other cases. Thus, WRT can be considered load-tolerant according to the definition stated above.

The load-tolerance of WRT can be examined by means of simulations. The simulations are focused on the qualitative behavior of WRT under different grades of overload, rather than its quantitative behavior at a specific load. Simulations comparing WRT with RIO and WRED show that WRT offers equal differentiation to these mechanisms. Thus, other simulation studies of RIO and WRED, providing quantitative results, are likely to be applicable to WRT.

For constructing end-to-end services, load-tolerance is advantageous for several reasons. First, traffic control does not need to be so accurate and/or a larger portion of prioritized traffic can be allowed in a network. Moreover, failure in controlling this prioritized traffic cannot cause any starvation.

BRIEF SUMMARY OF THE INVENTION

It is an object of the present invention to provide a queuing mechanism creating multiple levels of drop precedence which can prevent starvation of low prioritized traffic.

It is a further object of the present invention to provide a queuing mechanism creating multiple levels of drop precedence which can preserve a strict hierarchy among precedence levels—that is, traffic using a certain precedence level must always experience less probability of loss than traffic using a less prioritized level of drop precedence.

According to a first aspect of the present invention, there is provided a method of active queue management, for handling prioritised traffic in a packet transmission system, adapted to provided differentiation between traffic originating from rate adaptive applications that respond to packet loss, in which traffic is assigned one, of at least two, drop precedent levels, characterised by preventing starvation of low prioritised traffic while, at the same time, preserving a strict hierarchy among precedence levels, and providing absolute differentiation of traffic.

According to a second aspect of the present invention, there is provided a method of active queue management for handling prioritised traffic in a packet transmission system, adapted to provided differentiation between traffic originating from rate adaptive applications that respond to packet loss, in which traffic is assigned one, of a plurality of drop precedence levels, characterised by using a modified RIO, ItRIO, combined with WRED, so that a plurality of threshold levels, for average queue length, are created, by applying different drop probabilities to each precedence level and by setting all maximum threshold levels to the same value.

Absolute differentiation may be provided if prioritised traffic is fully controlled and relative differentiation may be provided in other cases.

At least two drop precedence levels may be provided, in profile and out of profile, a packet, tagged as in profile may be reclassified as out of profile, when a drop probability assigned to the packet is greater than a drop probability calculated from the average queue length for in profile packets, and a packet tagged as out of profile may be discarded when a drop probability assigned to the packet is greater than a drop probability calculated from the average queue length for out of profile packets.

A maximum threshold value for the average queue length for out of profile packets, max_th_out, and a maximum threshold value for the average queue length for in profile packets, max_th_in, may be provided and max_th_out may be set to a greater value than max_th_in.

A set of threshold parameters, max_th_in, min_th_in and max_p_in, may be used instead of RED parameters, to determine whether an in profile packet should be tagged as out of profile.

Said plurality of threshold values, max_th#, may be set to the same value.

Three levels of drop precedence may be provided, and an average queue length for each level of drop precedence may be calculated based on packets tagged with that level, and packets tagged with a higher level, of drop precedence.

A unique threshold may be assigned to each of the two highest prioritised precedence levels, said unique thresholds being used to determine when a packet is to be tagged with a lower precedence level, and a relative differentiation among said three levels may provided when the average queue lengths for the two highest precedence levels exceeds both thresholds.

More than three drop precedence levels may be provided and an average queue length parameter may be employed for each drop precedence level with associated thresholds min_th#s and max_p#s.

Eight drop precedence levels may be provided.

A single minimum threshold, th_in, may be provided for all precedence levels such that no packets are dropped if the average queue length is less than th_in.

According to a third aspect of the present invention, there is provided a method of active queue management for handling prioritised traffic in a packet transmission system, adapted to provided differentiation between traffic originating from rate adaptive applications that respond to packet loss, in which traffic is assigned one, of at least a first and second, drop precedent level, namely in profile and out of profile, characterised by:

calculating an average queue length, avg_ql;
assigning minimum thresholds, min_th_in and min_t-h_out, for in profile packets and out of profile packets respectively, and a maximum threshold, max_th;
retaining all packets with their initially assigned drop precedent levels while the average queue length is less than, or equal to, a threshold th_in;
assigning a drop probability to each packet, determined from the average queue length;
retaining all packets while avg_ql is less than th_in; and
dropping packets in accordance with their assigned drop probability;

and by max_p_out being greater than max_p_in, where max_p_out is the maximum drop probability of packets marked as out of profile and max_p_in is the maximum drop probability for packets marked as in profile.

Said method may be applied to a FIFO queue.
Said method may include the steps of:
dropping a packet if avg_ql, when the packet arrives, is >max_th;
for a packet tagged as in profile, calculating avg_ql_in, and, if avg_ql_in >th_in and min_th_in <avg_ql, calculating Pin and dropping, or retaining, said packet in accordance with the value of Pin,
for a packet marked as out of profile, if min_th_out <avg_ql, calculating Pout, and dropping, or retaining, said packet in accordance with the value of Pout.

A plurality of drop precedence levels, greater than two, may be employed and an average queue length may be derived for each drop precedence level.

Said max_th for each drop precedence level may be set to the same value.

Three levels of drop precedence may be provided, and an average queue length may be calculated for each level of drop precedence based on packets tagged with that level and packets tagged with a higher level of drop precedence.

A unique threshold may be assigned to each of the two highest prioritised precedence levels, said unique thresholds being used to determine when a packet is to be tagged with a lower precedence level, and a relative differentiation may be provided among said three levels when the average queue lengths for the two highest precedence levels exceeds both thresholds.

More than three drop precedence levels may be provided and an average queue length parameter may be employed for each drop precedence level with associated thresholds min_th#s and max_p#s.

Eight drop precedence levels may be provided.

A single minimum threshold, th_in, may be provided for all precedence levels such that no packets are dropped if the average queue length is less than th_in.

According to a fourth aspect of the present invention, there is provided a telecommunications system for transmission of packet data, characterised in that said telecommunications system employs a method of active queue management as set forth in any preceding paragraph.

Said telecommunications system may be an internet.

According to a fifth aspect of the present invention, there is provided a router for use with a telecommunications system as set fourth in any preceding paragraph characterised in that said router employs a method of active queue management as set forth in any preceding paragraph.

BRIEF DESCRIPTION OF THE SEVERAL VIEWS OF THE DRAWINGS

Embodiments of the invention will now be described, by way of example, with reference to the accompanying drawings, in which:

FIG. 7 lists a pseudo-code for WRT.

FIG. 9 is a table showing bandwidth allocation limits with ItRIO.

DETAILED DESCRIPTION OF THE INVENTION

A glossary of the abbreviations used in this patent specification is set out below to facilitate an understanding of the present invention:

| | |
|---|---|
| AF: | Assured Forwarding |
| AQM: | Active Queue Management |
| CS: | Class Sector |
| DiffServ: | Differentiated Services |
| EF: | Expedited Forwarding |
| FIFO: | First In First Out |
| IETF: | Internet Engineering Task Force |
| IP: | Internet Protocol |
| ISP: | Internet Service Provider |
| ItRIO: | Load Tolerant RIO |
| PHB: | Per Hop Behaviour |
| RED: | Random Early Detection |
| RIO: | RED In and Out |
| RTT: | Round Trip Time |
| TCP: | Transmission Control Protocol |
| TSW: | Time Sliding Window |
| UDP: | User Datagram Protocol |
| WRED: | Weighted RED |
| WRT: | WRED with Thresholds |

The main objective of AQM mechanisms is to reduce the average queue length in routers. This provides less delay, avoids flows being locked out and, optimally, reduces the number of packets dropped in congested routers. In addition, AQM can be used to implement service differentiation between different flows, e.g., TCP flows. An advantage with AQM is that one single FIFO queue can be used for all traffic belonging to these flows. This is advantageous if reordering of packets within flows is to be avoided. It should be noted that in FIFO queues, packets are forwarded in the same order as they arrive.

WRED and RIO are two examples of the use of AQM to achieve service differentiation. WRED and RIO are both extensions to RED, which is briefly described below.

RED was originally proposed in 1993 by Floyd and Jacobson, see:

Floyd S. and Jacobson V. (1993), Random Early Detection Gateways for Congestion Avoidance, IEEE/ACM Transactions on Networking, August 1993;

and is now recommended for deployment in the Internet, see:

Braden B. et al (1998), Recommendations on Queue Management and Congestion Avoidance in the Internet, IETF RFC 2309, April 1998.

Figure 1:
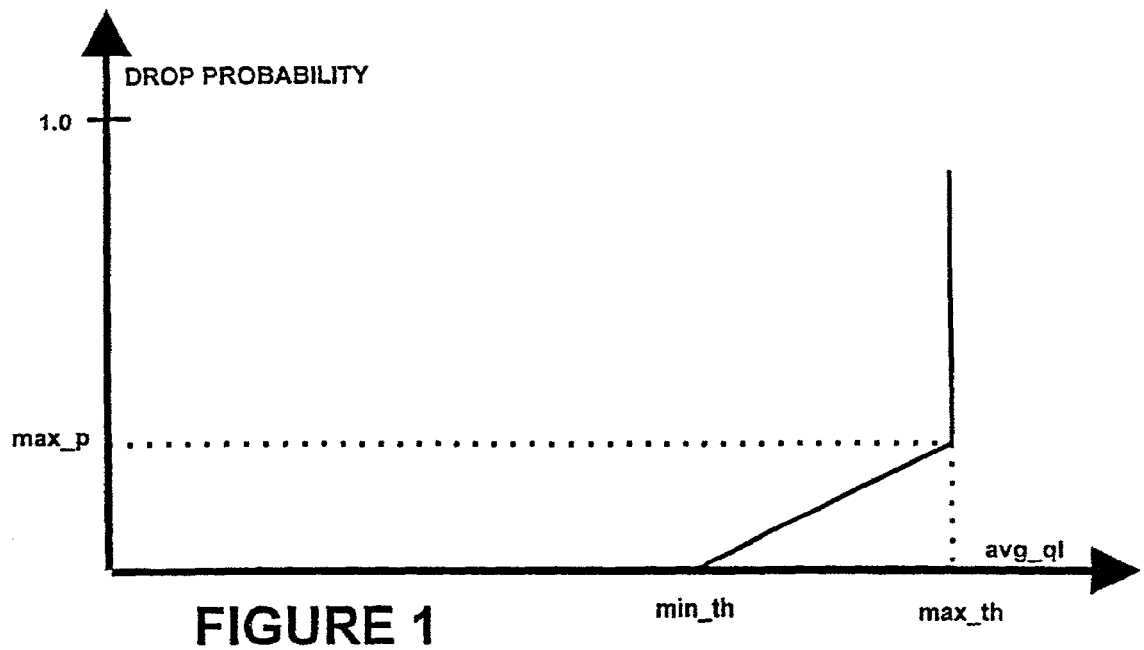
FIG. 1 illustrates the RED mechanism.

RED allows a router to drop packets before any queue becomes saturated. Responsible flows will then back off, in good time, resulting in shorter average queue sizes. This is desirable for several reasons. The queuing delay will decrease, which is good for applications such as interactive games. Another advantageous property of RED is that packet drops will not occur in bursts. This decreases the likelihood of TCP flows going into slow-start phase due to multiple consecutive lost packets. RED achieves this by dropping packets with a certain probability depending on the average queue length (avg_ql), see FIG. 1.

Unfortunately, the optimal configuration for RED depends on traffic patterns and characteristics. For example, if there is a large number of TCP flows present in a queue, RED needs to be aggressive to achieve its goal, i.e., max_p has to be set high. Otherwise the queue is likely to grow towards its limit and it will eventually behave as an ordinary tail-drop queue. On the other hand, if only a small number of flows are present in a queue, a too aggressive RED can reduce the utilization of the link in question. Adaptive RED, see:

Feng W., Kandlur D., Saha D. and Shin K. (1997), Techniques for Eliminating Packet Loss in Congested TCP/IP Networks, Technical Report, University of Michigan, November 1997, URL: http://www.eecs.umich.edu/~wuchang/work/CSE-TR-349-97.ps.Z is an attempt to solve this configuration problem. However, this mechanism does not solve the problem if a large amount of the traffic originates from applications not responsive to network congestion, e.g., realtime applications using UDP, or short-lived http transfers using TCP.

WRED, defined and implemented by Cisco, and RIO, proposed and evaluated with simulations by Clark and Fang, are two AQM mechanisms defined for service differentiation in IP networks. They are both based on RED and offer differentiation by managing drop precedence.

Figure 2:
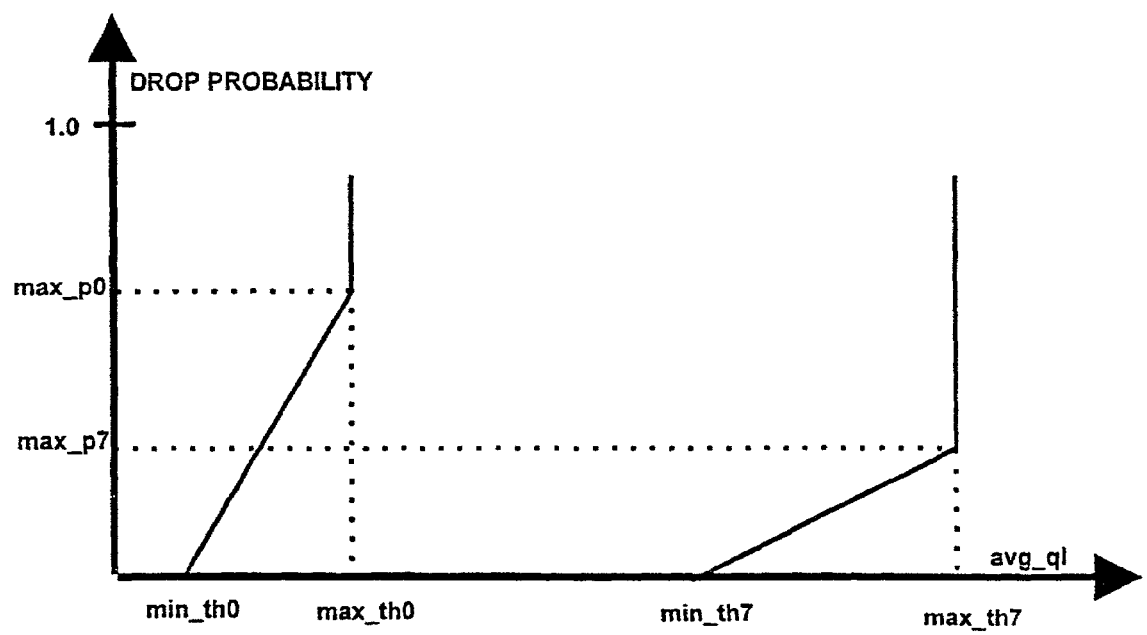
FIG. 2 illustrates the WRED mechanism.

With WRED, eight separate levels of drop precedence can be configured. Each of these levels is configured with a separate set of RED parameters—see FIG. 2. RIO, on the other hand, has only two sets of RED parameters. Hence, in its basic version, two levels of drop preference can be created, i.e., one level for packets tagged as in profile and another level for packets tagged as out of profile.

The main difference between RIO and WRED is that RIO uses two average queue lengths for calculating drop probabilities, while WRED only uses one. WRED calculates its average queue length (avg_ql) based on all packets present in the queue. RIO does this as well but, in addition, it calculates a separate average queue length for packets in the queue tagged as in profile (av_ql_in)—see FIG. 3.

There is a clear distinction between absolute and relative differentiation between levels of drop precedence. In this context, absolute differentiation implies that a certain precedence level offers a quantifiable bound on loss. That is, traffic using that particular level is guaranteed a maximum loss rate. Thus, a TCP flow can be given an absolute quantified throughput independent of the throughput other TCP flows will experience.

A maximum bound on loss can only be offered to traffic that is properly controlled. That is, the rate at which prioritized packets arrive at the network must be limited to ensure that the drop rate never exceeds the bound. Consequently, traffic control is necessary to create absolute differentiation of services.

A relative differentiation does not offer any quantifiable bounds on loss. Instead, the drop rate for each precedence level is defined in relation to some other level. For example, one precedence level may offer half the drop rate of another level. From these drop rates, defined in relation to each other, a differentiation in throughput can be achieved between TCP flows.

When supporting an absolute differentiation for traffic using a particular level of drop precedence, traffic using other precedence levels may get starved. This problem can occur if traffic using the absolute level is insufficiently controlled. That is, the arrival rate for traffic that is to be given an absolute bound on loss exceeds the rate at which the network can support that bound.

WRED and RIO can be configured to support an absolute differentiation. To create such a differentiation, these settings require proper control of traffic using the precedence level supporting absolute differentiation only. That is, traffic using other precedence levels need not be controlled.

Figure 4:
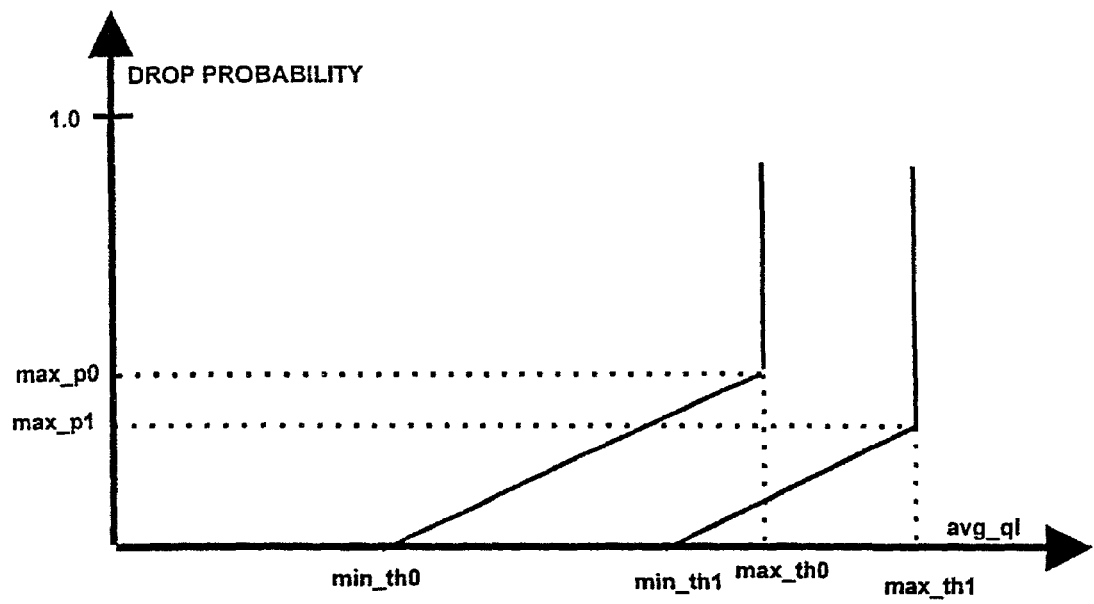
FIG. 4 illustrates WRED configured to offer an absolute differentiation.

With WRED, absolute differentiation is supported by setting max_th# to separate values. Moreover, max_p#s and min_th#s must be set to ensure that higher prioritized packets always experience lower loss probability than less prioritized packets. An example of such a configuration with two levels of drop precedence is shown in FIG. 4.

With this kind of configuration, a maximum bound on loss is provided if av_ql never grows larger than max_th1, see:
Braden R. et. al. (1997), Resource Reservation Protocol (RSVP)—Version 1 Functional Specification, IETF RFC 2205, September 1998.

However, to avoid starvation of traffic tagged with precedence level zero, av_ql must not exceed max_th0. Adequate traffic control is, therefore, needed to offer absolute differentiation of services with WRED.

When using RIO to create an absolute differentiation, max_th_in should be set equal to, or larger than, max_th_out. Otherwise, traffic tagged as in profile may experience a higher drop rate than traffic tagged as out of profile. This would break the strict hierarchy between drop precedence levels. Hence, such a configuration is not advisable.

Figure 3:
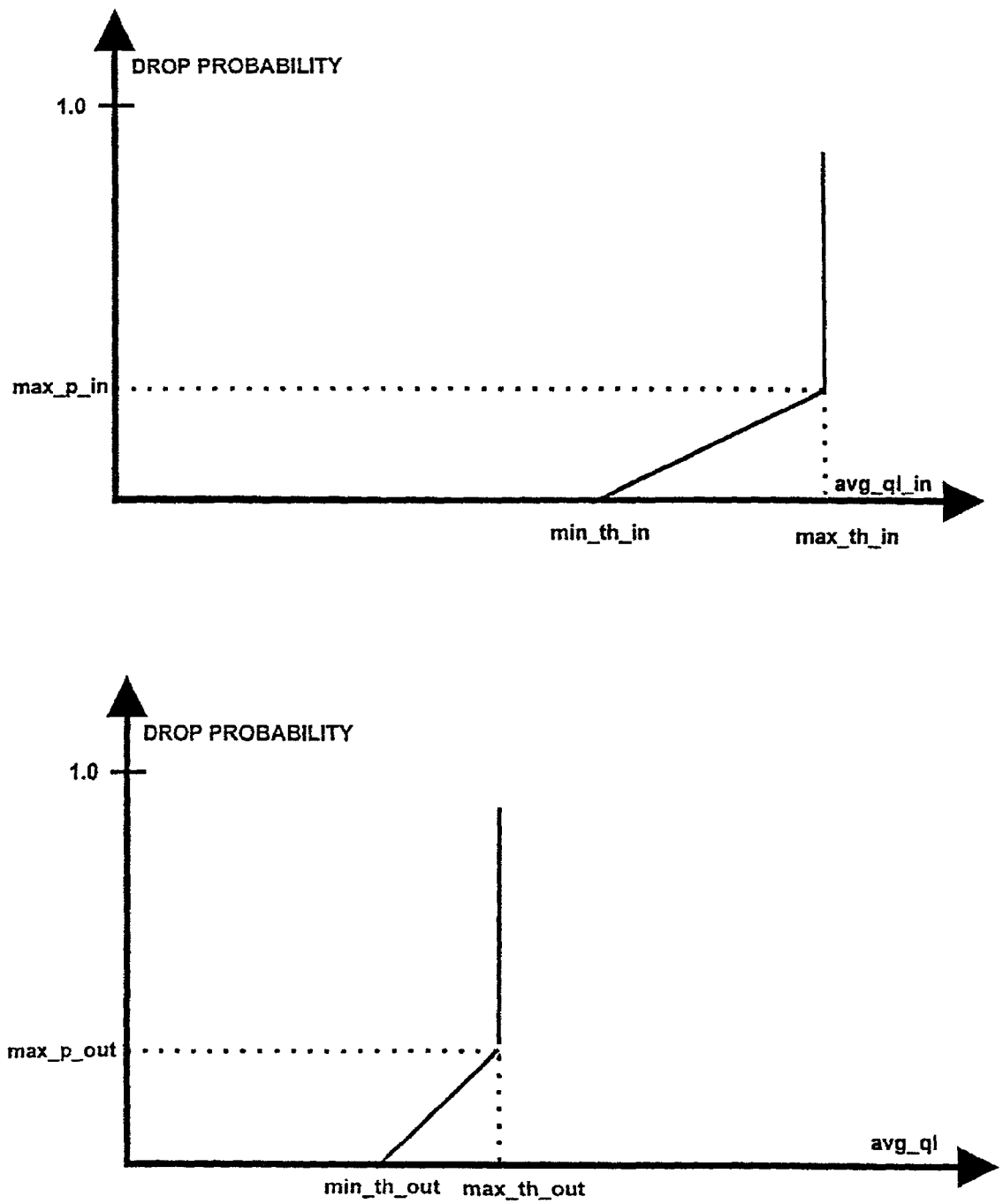
FIG. 3 illustrates the RIO mechanism.

The configuration of RIO shown in FIG. 3 can be used to offer an absolute differentiation. For example, a maximum bound on loss is offered, if avg_ql_in never grows larger than max_th_in. However, as with WRED, starvation of lower prioritized traffic, i.e. traffic tagged as out of profile, can occur if higher prioritized traffic is not properly controlled. With RIO, this control has to ensure that avg_ql never exceeds max_th_out.

Neither WRED, nor RIO, can meet the requirements for load-tolerance when configured to support absolute differentiation. Prioritized traffic has to be properly controlled to avoid starvation of less prioritized traffic and to ensure that a strict hierarchy is preserved between levels of drop precedence. WRED can, however, meet these requirements when configured to offer a relative differentiation among precedence levels.

A relative differentiation can be created with WRED if all max_th#s are set equal. The differentiation offered depends on the settings of min_th#s and max_p#s. These parameters must be set to ensure a strict hierarchy between the levels of drop precedence.

Figure 5:
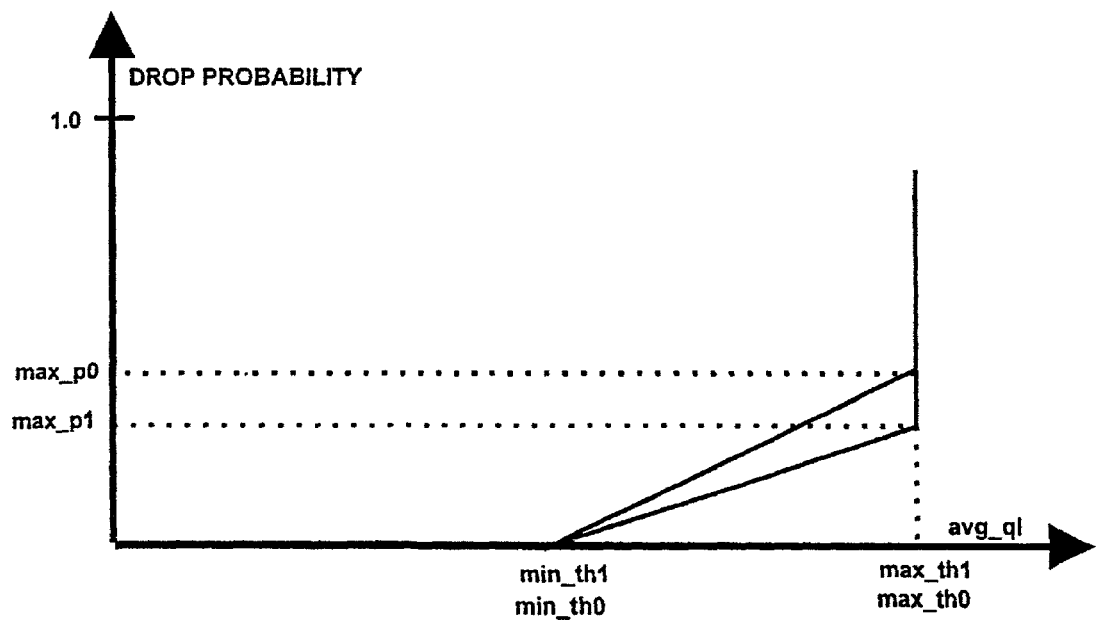
FIG. 5 illustrates WRED configured to offer a relative differentiation.

With the setting of WRED, shown in FIG. 5, traffic using precedence level one will experience half of the drop rate of traffic using precedence level zero. However, that relation can only be preserved during modest overload. That is, only a small portion of the traffic comes from applications not responsive to network congestion, e.g. real-time applications using UDP, or short-lived http transfers using TCP.

When the portion of traffic coming from applications not responsive to network congestion gets larger, the overload becomes more severe. If the overload gets severe enough, the queue will eventually behave just as a tail-drop queue. The exact relative differentiation provided depends on traffic characteristics as well as the configuration of WRED.

RIO cannot be configured to offer a relative differentiation. This is because RIO uses a separate variable (av_ql_in) to calculate the probability, Pin, of dropping a packet marked as in profile that arrives at the queue. This separate variable does not contain any information about the number of packets, in the queue, marked as out of profile. The calculation of Pin can, therefore, not be related to the probability Pout of dropping the packet if it had been marked as out of profile.

The present invention comprises a new queuing mechanism that, without reconfiguration, provides an absolute differentiation if the prioritized traffic is properly controlled and a relative differentiation in other cases. This mechanism, Weighted RED with Thresholds (WRT), is constructed by combining RIO with WRED.

The present invention adopts, from RIO, the idea of calculating two separate average queue lengths. However, instead of discarding packets marked as in profile when avg_ql_in exceeds max_th_in—see FIG. 3, these packets are treated as if they were marked as out of profile. This means that max_th_in can, and should, be set lower than max_th_out to avoid starvation. With this change, the mechanism can support absolute differentiation as long as av_ql_in does not exceed max_th_in. This mechanism supports a differentiation equal to that supported by RIO. If avg_ql_in does exceed max_th_in, there will be no differentiation whatsoever. The queuing mechanism will then behave as RED. For convenience, this mechanism will be referred to as load-tolerant RIO (ItRIO).

The number of parameters present in ItRIO can be reduced by using a threshold instead of a set of RED parameters, namely max_th_in, min_th_in and max_p_in, to decide when in packets are to be treated as if the were tagged as out of profile. This simplification is not expected to have any notable affect on the behavior of ItRIO. This is because the random early congestion signalling will be made based on the RED parameters associated with av_ql for packets tagged as in and out of profile. With RIO, this signalling is based on RED parameters associated with av_ql for packets tagged as out of profile and RED parameters associated with av_ql_in for packets tagged as in profile.

To achieve a relative differentiation when avg_ql_in exceeds max_th_in, a mechanism is needed to apply different drop probabilities to each precedence level. As previously discussed, WRED provides this when all max_th#s are set equal. Thus, by combining ItRIO with WRED this property is obtained in the queuing mechanism of the present invention. For the queuing mechanism of the present invention, the max_th#s are not permitted to be set separately from each other This is because such a setting may cause starvation of traffic using less prioritized precedence levels.

Figure 6:
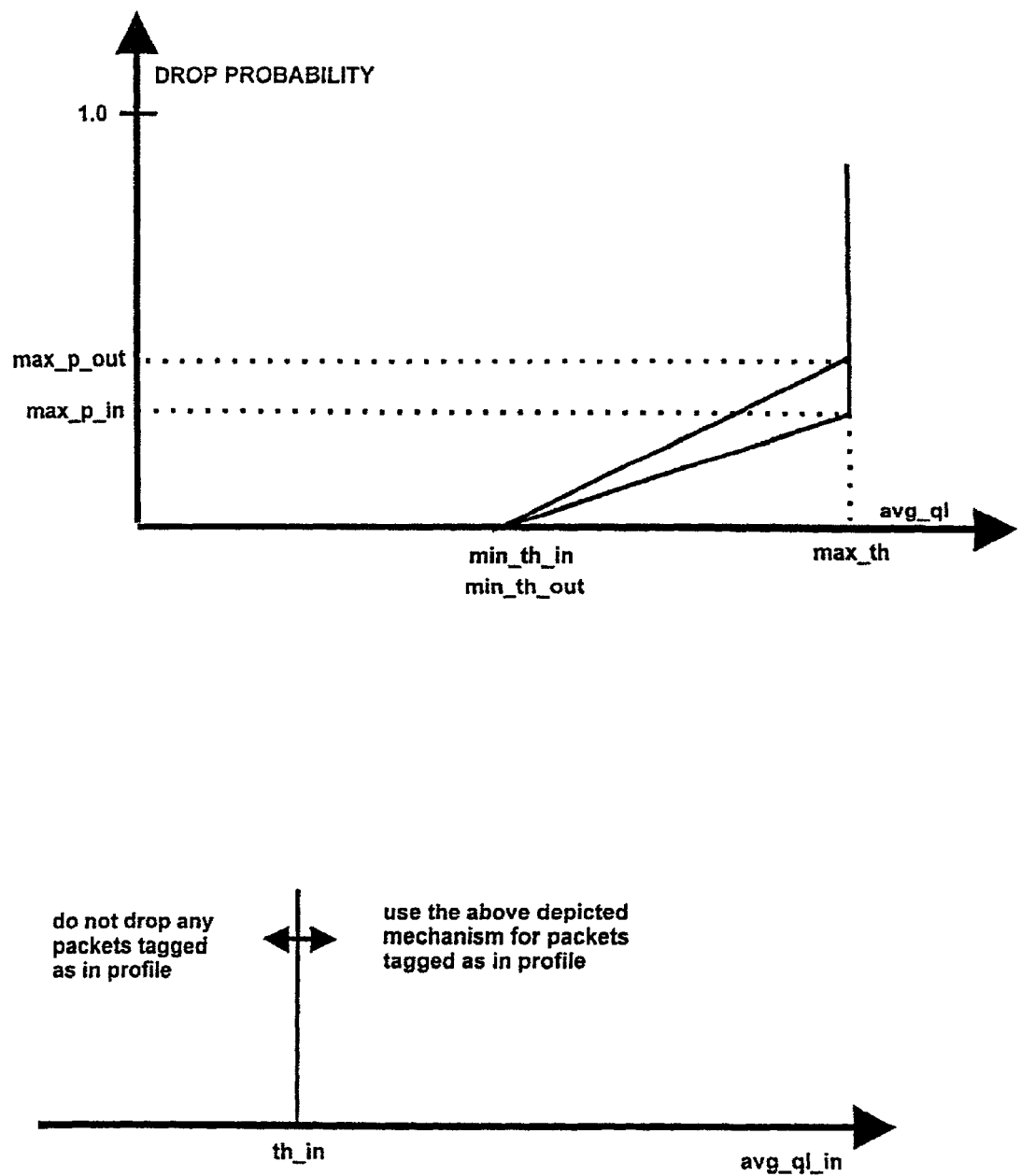
FIG. 6 illustrates the WRT mechanism of the present invention.

The combined scheme, WRT, can be used to create a relative differentiation between eight precedence levels when av_ql_in exceeds th_in. However, for the purposes of this description only two of these levels which, for simplicity, are called the in and out level respectively, are used. WRT is depicted in FIG. 6.

FIG. 7 shows how WRT, with two levels of drop precedence, can be implemented. The implementation has basically the same complexity as an implementation of RIO.

For the AF PHB group, three levels of drop precedence are specified. To create these three levels, WRT has to be extended with support for one additional level of drop precedence. This implies that WRT has to be extended with one more threshold associated with an additional average queue length. Thus, for each of the three levels of drop precedence, a separate average queue length is calculated, based on packets tagged with that level and every other packet tagged with any higher prioritized level.

A unique threshold is assigned for each of the two highest prioritized precedence levels. These thresholds are used to decide when packets must be treated as if they were marked with a lower prioritized precedence level. The threshold for the highest level must be set to a lower value than the threshold for the second highest level (the order at which the thresholds are set defines the order in priority between the precedence levels).

When the average queue lengths for the two highest prioritized levels exceeds both thresholds, a relative differentiation is provided among the three levels of drop precedence. The relative differentiation depends on how the min_th# and max_p# is configured for each of these levels and the current load of irresponsible traffic.

Whenever needed, WRT can be extended to support more levels of drop precedence by adding additional average queue length variables with associated thresholds, min_th#s and max_p#s.

The load-tolerance of ItRIO and WRT can be assessed by using simulations. The simulations can be made with a network simulator (ns), see:

UCB/LBNL/VINT Network Simulator—ns (version 2) (1998), URL: http://www-mash.CS.Barkeley.EDU/ns/.

This allows it to be shown that ItRIO can offer an equal differentiation to that offered by RIO and that WRT can offer the same differentiation as WRED.

The simulations presented below enable the qualitative behavior of WRT under different grades of overload to be examined. Moreover, by comparing WRT with RIO and WRED it can be demonstrated that WRT can offer the same differentiation as these mechanisms.

Figure 8:
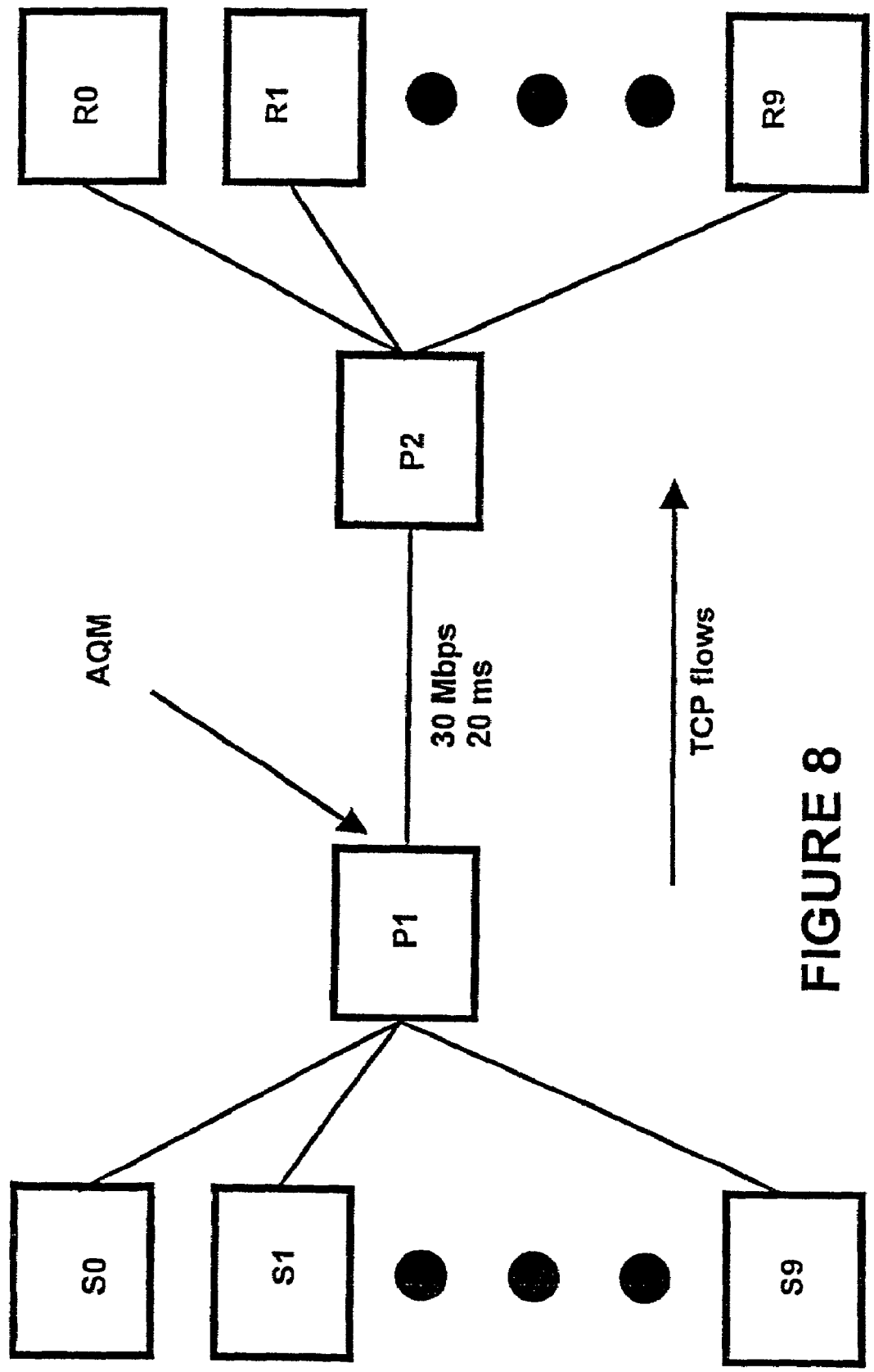
FIG. 8 illustrates a simulation arrangement.

To perform the evaluation, a simple simulation setup is used. A topology with ten hosts (SO, . . . , S9) connecting to their respective destinations (RO, . . . , R9) via one common link is used. This link, P1–P2, is a bottleneck of 30 Mbps with 20 ms delay, see FIG. 8.

The AQM mechanisms evaluated are applied to the queue attached to the bottleneck link. Each host has ten TCP Reno connections with their respective destinations. The throughput for each of these TCP flows is measured over 16 simulated seconds. However, every simulation goes through an initiation phase of three to four simulated seconds before these measurements are initiated. This is to let the queue stabilize before the behavior of the AQM mechanisms to be evaluate is observed. The TCP connections are initiated randomly within the first simulated second. All these connections have the same RTT (40 ms).

A time sliding window (TSW) rate estimator is used for each of the ten hosts, to tag packets as in profile up to a certain rate. Thus, one service profile is applied for all ten TCP connections at every single host. There are two different approaches to tagging packets, based on the rate estimated with the TSW. The first approach is more general and can be applied to aggregated TCP traffic as well as to individual TCP connections. The second approach should only be applied to individual connections but is then more effective if the estimator is placed close to the sending host. Since the estimator is applied to an aggregate of ten TCP connections the first approach is more appropriate for the simulations herein described.

With the first approach, the window size should be set to a large value, i.e. of the order of a TCP saw tooth from 66 to 133 percent of the rate specified in the service profile. Too small a window may cause the aggregate throughput to be less than that specified in the profile. On the other hand, with too large a window, the traffic marked as in profile can become more bursty. Hence, the window size may affect the throughput experienced by individual TCP flows and the rate variation of packets marked as in profile arriving at core routers. Unfortunately, this implies that there is a circular dependency between the length in time of a saw tooth and the window size. In addition, the length of a saw tooth will vary because packets may be randomly dropped in the network. An appropriate window size for a certain TCP connection is, therefore, hard to choose, based on known parameters only. Thus, it may be necessary to adapt the window size based on real time measurement of each individual TCP flow.

For all the simulations, the window size is set to 300 ms. This value is chosen on the basis of the following argument. Assume that the target rate of a certain TCP connection is set to 500 kbps. The RTT is 80 ms, including the average queuing delay and the average packet size is set to 8000 bits in the simulations. This TCP connection will then have five packets on the fly, on average, and a congestion window of the size of five packets of data, on average. Optimally, the number of packets on the fly and the size of the congestion window will then vary between 1.33*5 and 0.66*5. The variation is thus 0.67*5=3.35 packets. Since TCP increases its congestion window with one segment of data, equivalent to the payload of one packet, the most for each RTT, the length in time of a TCP saw tooth is 3.35*0.08=0.268s.

Figure 11:
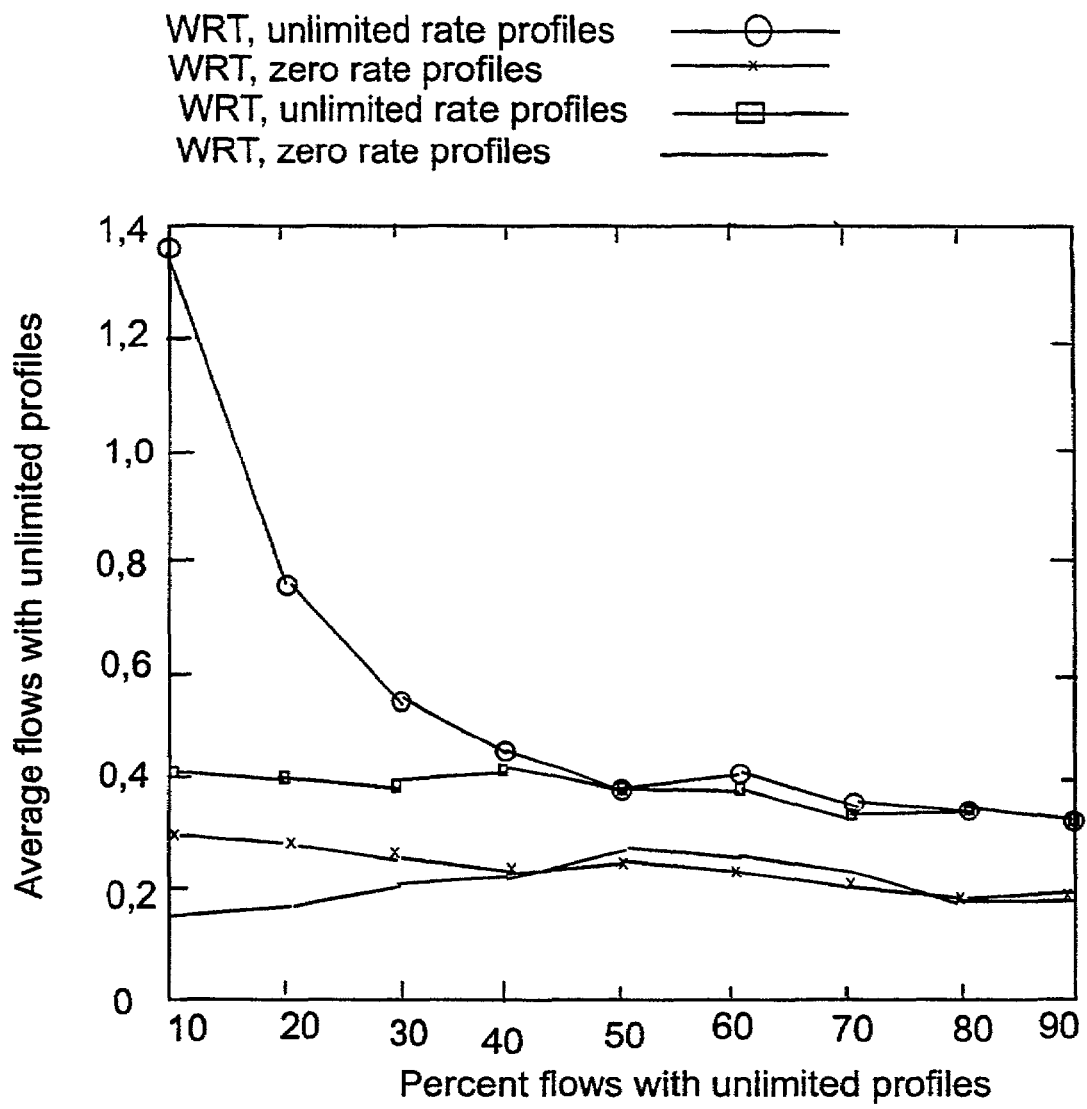
FIG. 11 shows the characteristics of WRED and WRT.

To perform an evaluation of the properties of ItRIO and WRT in comparison with RIO and WRED, the average throughput experienced by TCP sources sending all their downstream packets marked as in profile is observed, i.e., these sources have unlimited rate profiles. This is compared with the average throughput experienced by other TCP sources sending all their packets marked as out of profile, i.e., sources with zero rate profiles. The number of TCP sources with unlimited rate profiles is varied between 10 and 90 percent in steps of 10. The results are plotted in graphs with the average throughput as the y-axis and the percent of sources with unlimited rate profile as the x-axis. FIG. 11 shows the results for RIO and ItRIO.

RIO is, in this simulation, configured with max_th_in and min_th_in set to 100 packets, max_th_out to 200 packets, and min_th_out to 100 packets. Hence, the value of max_p_in is not relevant (since max_th_in and min_th_in are equal). The max_p_out parameter is set to 5 percent. ItRIO has the same configuration, i.e., the parameters present in both these mechanisms are set to the same values. The th_in parameter in ItRIO is set to 100 packets.

Figure 10:
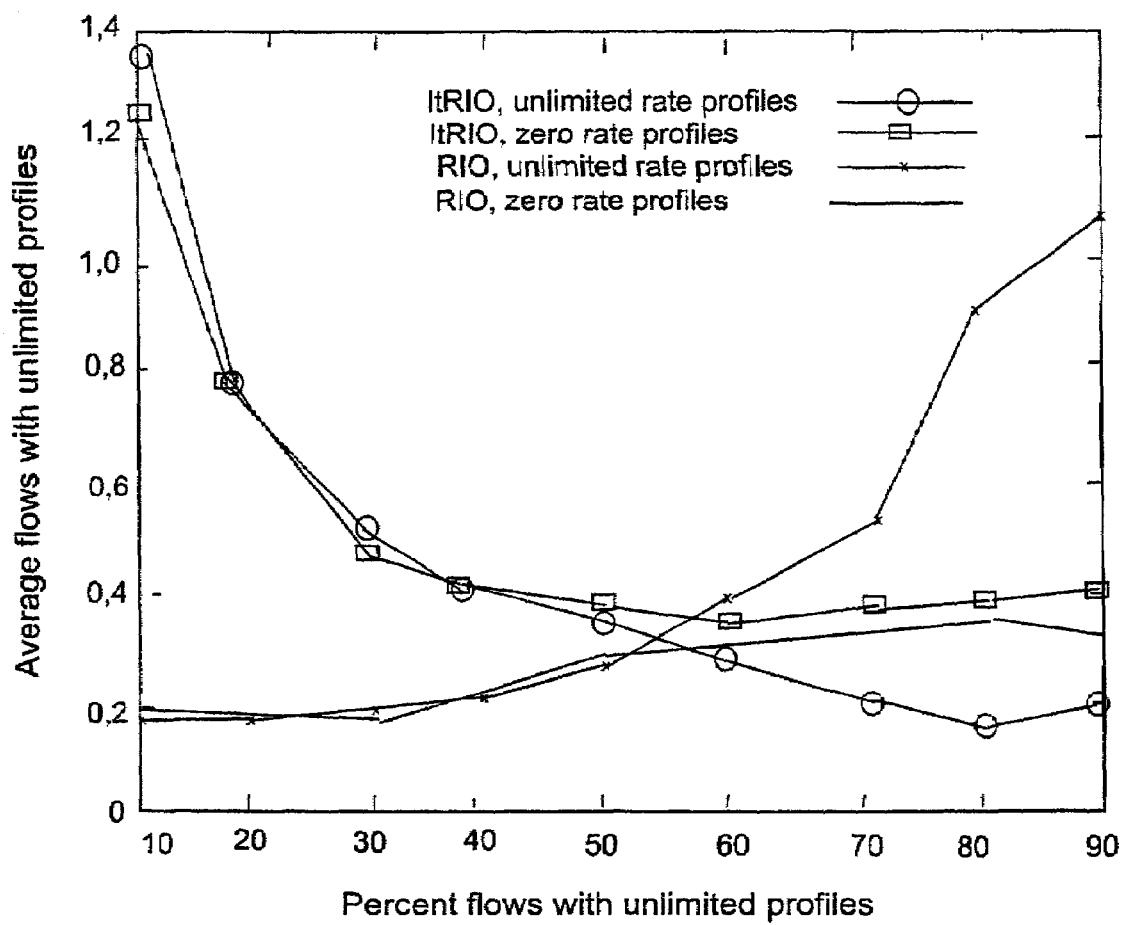
FIG. 10 shows the characteristics of RIO and ItRIO

It can be seen in FIG. 10 that ItRIO offers the same differentiation as RIO when the number of flows with unlimited rate profiles is less than 57 percent. Above that load, ItRIO behaves as RED while RIO no longer preserve the strict order of priority between the in and out precedence levels. Thus, ItRIO can support absolute differentiation without the risk of giving a lower quality of service to traffic marked as in profile than is given to traffic with a lower priority.

FIG. 11 shows the results for WRED and WRT. WRED is, in this simulation, configured with max_th0 and max_th1 set to 200 packets min_th0 and min_th1 to 100 packets max_p0 to 5 percent, and max_p1 to 2.5 percent. The parameters for the other six precedence levels are not relevant since only level zero and one are used (level one is applied to traffic marked as in profile and level zero to traffic marked as out of profile). The parameters present in both mechanisms are set to the same value. The max_th parameter in WRT is set to 100 packets.

In FIG. 11 it can be seen that WRT offers a relative differentiation when the number of flows with unlimited rate profiles exceeds 50 percent. This differentiation is the same as the one offered with WRED. When the number of flows with unlimited rate profiles is less than 50 percent, WRT offers the same differentiation as RIO and ItRIO.

Hence, with this particular configuration, WRT behaves as RIO and ItRIO if the number of flows with unlimited rate profiles is less than 50 percent and otherwise as WRED. This means that WRT preserves the strict hierarchy between drop precedence levels independent of load. Based on these observations it can be concluded that WRT can be used to create an absolute differentiation if the prioritized traffic is properly controlled and a relative differentiation otherwise.

Allowing sources to have unlimited rate profiles represents an extreme situation of overload since the only admission control present is based on the number of flows. This can be considered as a worst case scenario when control of the aggregated traffic marked as in profile has failed completely. Simulations with this kind of overload provide an indication of how sensitive the differentiation is to various numbers of TCP sources using unlimited rate profiles.

To investigate the sensitivity of the differentiation, a common profile of 5 Mbps is applied to ten percent of all TCP flows, i.e., all flows from host S9. The sources with unlimited rate profiles vary between 0 and 80 percent. Hence, this graph goes from 0 to 90 percent of flows with non-zero rate profiles, instead of from 10 to 90 percent as in the previous graphs. This is to show the throughput that the flows from S9 would have had if there was no overload, i.e., there are no TCP sources at all with unlimited rate profiles. ItRIO is used with the same configuration as in the simulation presented in FIG. 10.

Figure 12:
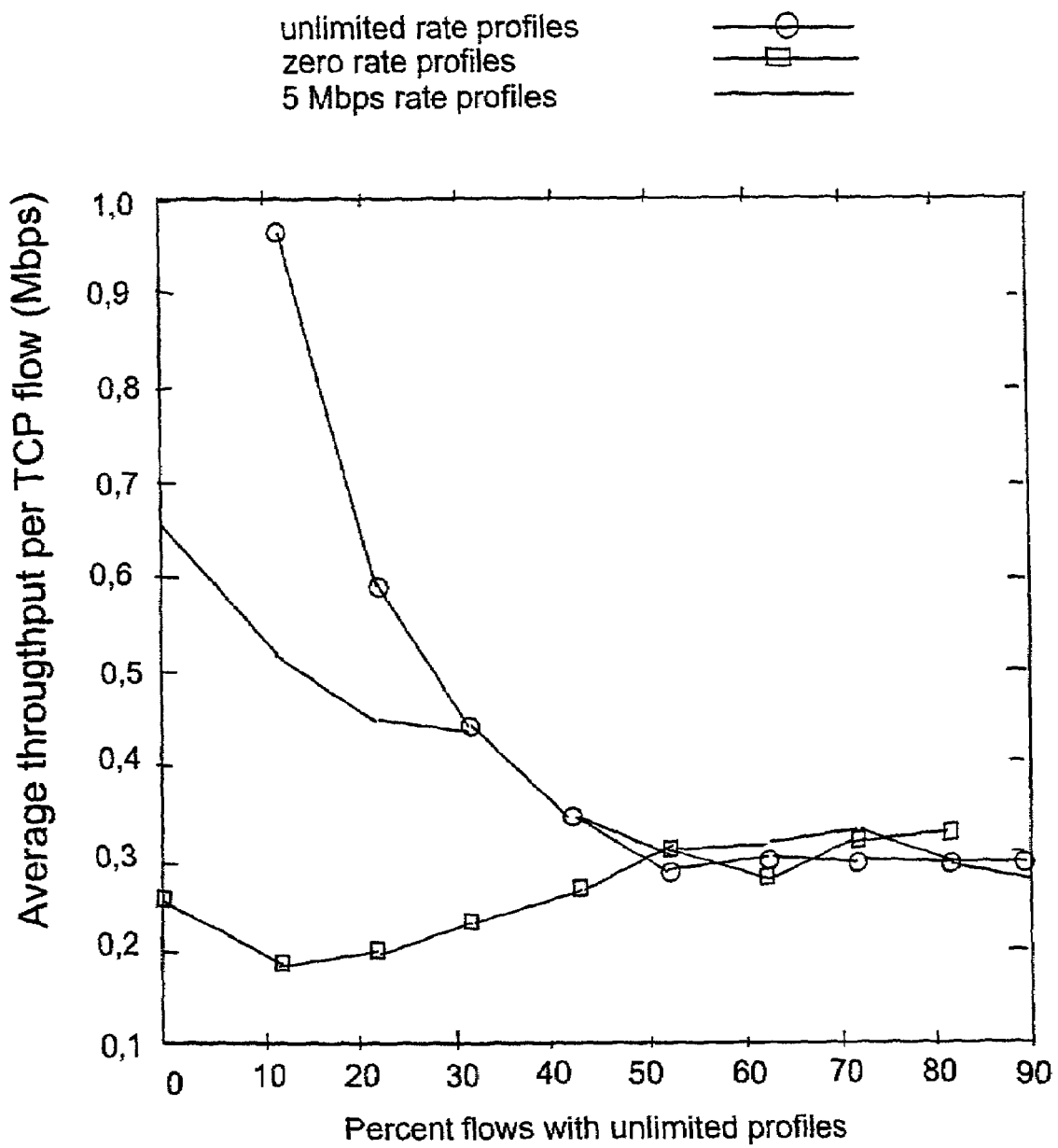
FIG. 12 shows ItRIO under sever overload.

FIG. 12 shows how the average throughput experienced by the ten controlled TCP sources degrades with an increasing number of flows using unlimited rate profiles. The controlled TCP sources are those with a common rate profile of 5 Mbps. It can be seen that a few uncontrolled TCP sources do not cause any severe degradation in throughput experienced by the TCP sources sharing the 5 Mbps profile. This presumes, however, that the flows with unlimited rate profiles are responsive to network congestion signalling, i.e., packet drops. Irresponsible applications would cause this degradation to be much more drastic.

As mentioned above, ItRIO and WRT offer the same differentiation as RIO, if avg_ql_in never exceeds th_in. The question is then at which load this will happen for a specific traffic distribution and configuration of these mechanisms. This issue can be studied by performing a set of iterative simulations. Through these simulations, the maximum amount of bandwidth that can be allocated without causing av_ql_in to grow larger than th_in can be determined.

Besides varying the target rate in the TSW rate, the same configuration is used as in the simulation of ItRIO shown in FIG. 10. The table set out in FIG. 9 presents the maximum rates for two different settings of th_in, i.e., ½ and ¾ of max_th (the max_th parameter is set to 200 packets). For each of these settings, three scenarios are simulated, with 30, 40 and 50 percent of all flows having non-zero rate profiles.

The table set out in FIG. 9 shows how bandwidth allocation limit depends on the setting of th_in relative to max_th. For these simulations, setting th_in to ½ and ¾ of max_th_out results in a bandwidth allocation limit close to ½ and ¾ of the link speed respectively. This relation can not, however, be expected to hold for any configuration of ItRIO and any possible traffic load. This is because the bandwidth allocation limit will depend on the variation of av_ql_in. The larger this variation is, the less bandwidth can be allocated without risking that avg_ql_in exceeds th_in. Such things as the window size in the TSW rate estimator and the configuration of the average queue length estimator in the queuing mechanism (RIO, ItRIO, or WRT) affect the variation of av_ql_in. Thus, the exact limit can only be found with real-time measurements. Nevertheless, a rough estimation of the bandwidth allocation limit for a certain link can still be made based only on the configuration of ItRIO.

The differentiation offered when the amount of bandwidth allocated is varied, instead of the number of TCP sources using unlimited rate profiles, can be studied by examining the average throughput experienced by 10 TCP sources sharing a rate profile of 5 Mbps. The total amount of bandwidth allocated is varied between 5 Mbps and 30 Mbps. Furthermore, the total number of TCP sources using a non-zero rate profile is varied between 30, 50 and 70 percent. ItRIO is configured in the same way as in the simulation presented in FIG. 10.

Figure 13:
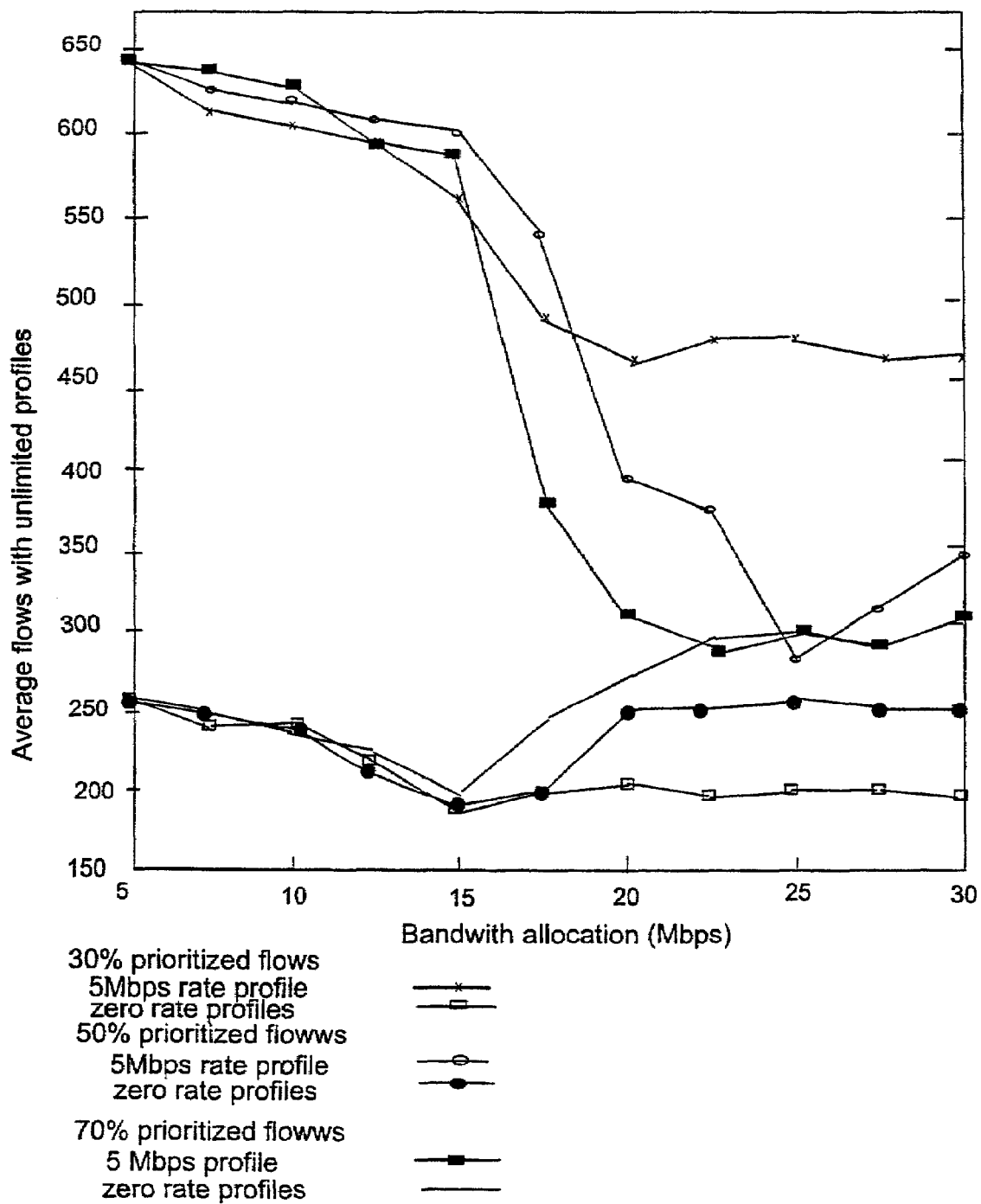
FIG. 13 shows ItRIO under limited overload.

In FIG. 13 it can be seen that the ten TCP sources using the common rate profile of five Mbps get more that 500 kbps throughput, on average, if the total amount of bandwidth allocated is less than 15 Mbps, i.e., ½ the link speed. When more bandwidth is allocated, the differentiation depends on the number of TCP sources having non-zero rate profiles. With this configuration, ItRIO preserves the strict hierarchy between the in and out precedence levels, if this number is less than 50 percent. If there are more than 50 percent of the TCP sources with non-zero rate profiles, ItRIO behaves, as expected, as RED. For comparison, RIO is simulated with the same loads, see FIG. 14. RIO is configured in the same way as the simulation presented in FIG. 10.

Figure 14:
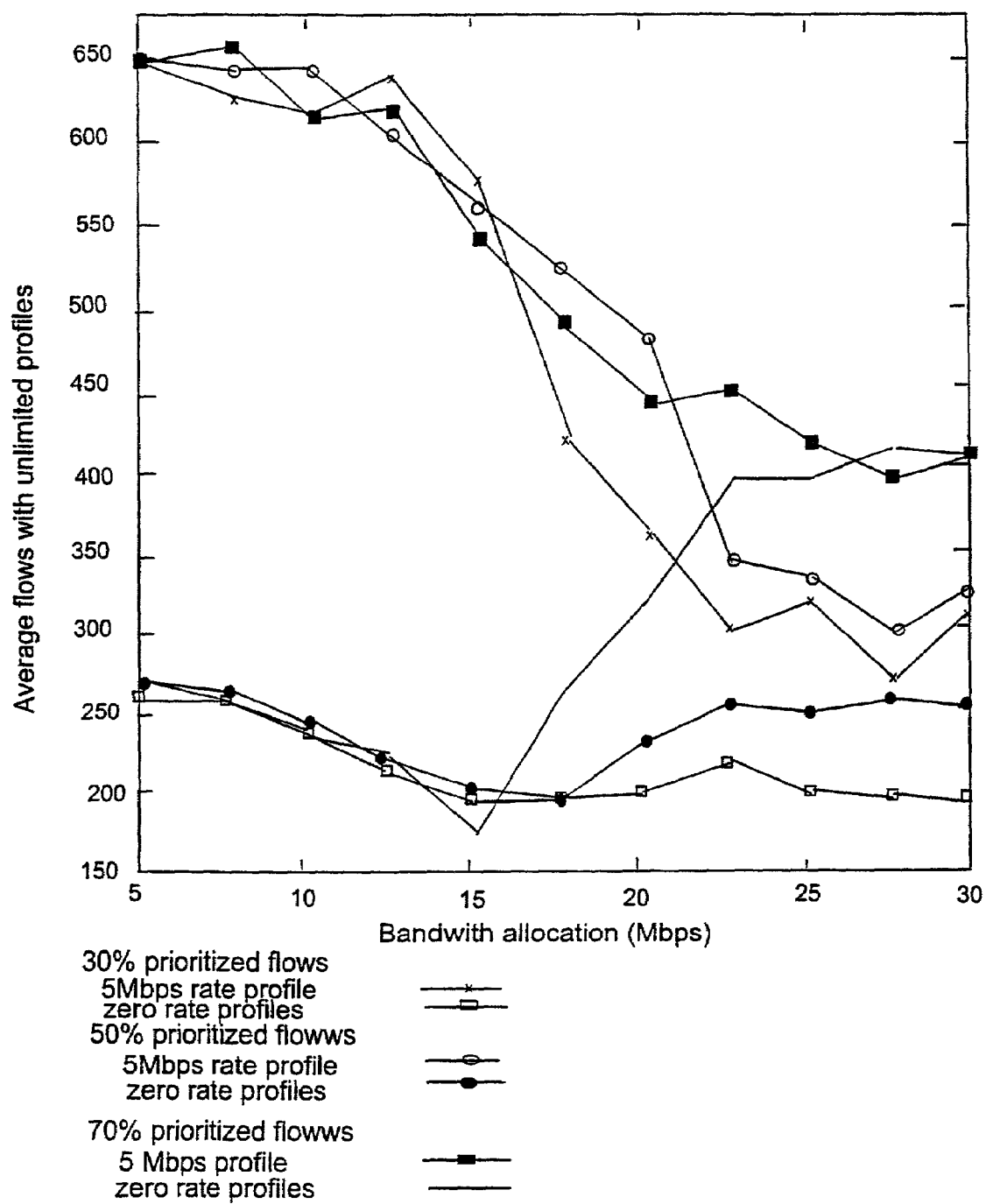
FIG. 14 shows RIO under limited overload

By comparing FIGS. 13 and 14 it can be seen that RIO offers a similar differentiation to ItRIO, if the total amount of bandwidth allocated is less than 15 Mbps. In addition, these two mechanisms offer a similar differentiation if the number of TCP sources having non-zero rate profiles is 50 percent, or less.

However, when the number of TCP sources with non-zero rate profiles are 70 percent and RIO is used, TCP sources with zero rate profiles experience more throughput, on average, than the ten connections sharing a 5 Mbps rate profile. This behavior can also be observed in FIG. 10.

Figure 15:
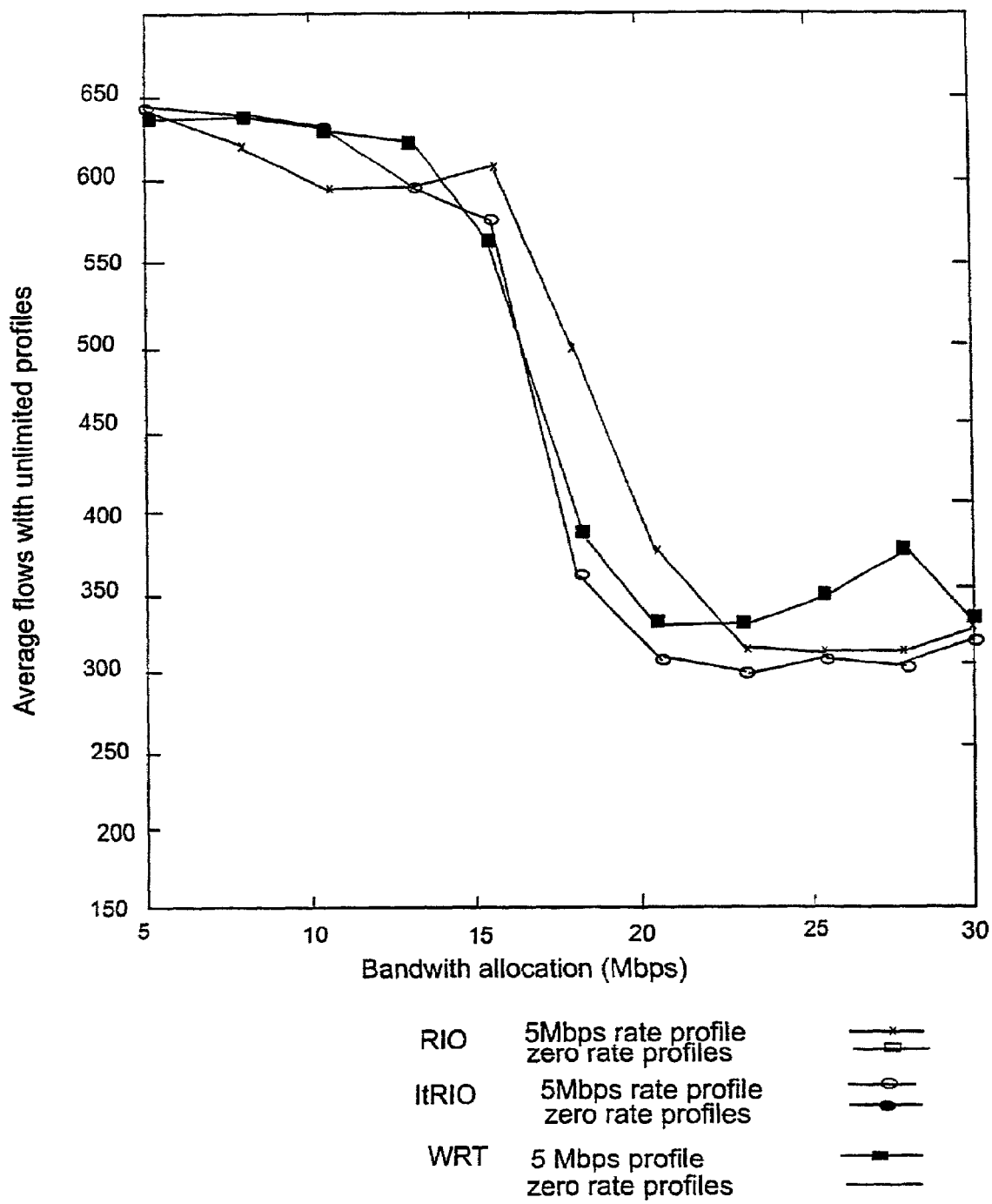
FIG. 15 shows the load tolerance of RIO, ItRIO and WRT.

To study the difference between RIO, ItRIO and WRT when the number of TCP connections having non-zero rate profiles exceeds 50 percent, WRT is simulated with 70 percent of the connections using non-zero rate profiles. The results from this simulation are shown in FIG. 15.

As expected from FIGS. 10 and 11, only WRT preserves the strict hierarchy between the levels of drop precedence. RIO fails completely in preserving this hierarchy and ItRIO behaves as RED when the bandwidth allocated exceeds 20 Mbps. Hence, WRT is the only queue mechanism, of these three, that can meet the requirements for load-tolerance.

The simulations, described above, show that WRT, without reconfiguration, provides an absolute differentiation, if the prioritized traffic is properly controlled and a relative differentiation otherwise. Neither RIO, nor WRED, can provide this with one single configuration. The absolute differentiation WRT offers is shown to be the same as for RIO, when the amount of prioritized traffic is controlled below a certain limit and the relative differentiation is shown to be the same as for WRED. The bandwidth allocation limit for when the differentiation changes from being absolute, to relative, can be roughly estimated based on the configuration of WRT. However, the actual bandwidth that can be allocated will be less than that estimated, if avg_ql_in has a non-negligible variation.

It should be noted that these results presume that only long lived TCP traffic is present in the queue managed by WRT. Greedy UDP traffic and/or short lived TCP traffic can affect the behavior of WRT. Any negative affect from such traffic can be expected to have a similar affect on RIO and WRED.

While constructing absolute quantifiable end-to-end differentiation of services based on levels of drop precedence, traffic control must be accurate to guarantee that this differentiation is provided at all times. In addition, it may be necessary to keep the portion of the traffic using an absolute service small to offer such a guarantee. Clearly, if only very little traffic can be given a service like this, the overall benefit from absolute services is limited.

However, the load-tolerance of WRT makes absolute services based on drop precedences more robust. Starvation cannot occur at any load. Hence, the network is more robust against failures in traffic control. Due to the robustness of WRT, the deployment time for absolute services based on drop precedences is likely to be shorter. In addition, more traffic using such absolute services can be allowed in the network without risking starvation.

Another positive effect of the load-tolerance of WRT is that traffic control need not be as accurate as with other AQM mechanisms, e.g., WRED, or RIO. A less accurate, perhaps measurement-based, control mechanism can ensure that an absolute differentiation is offered most of the time. If this control fails, a relative differentiation is guaranteed, as a minimum, if WRT is used.

RIO and WRED support an absolute quantifiable differentiation among levels of drop precedence when prioritized traffic is properly controlled. However, if this control fails these mechanisms can cause starvation of less prioritized traffic. Such failures occur due to inaccuracies in admission control and topology changes.

Starvation can be avoided with WRED, if it is configured to offer a relative differentiation. However, absolute differentiation of services is still necessary.

To offer an absolute differentiation between precedence levels without risking starvation, the present invention provides a new queue mechanism—WRT. Simulations have shown that WRT, without reconfiguration, provides an absolute differentiation, if the prioritized traffic is properly controlled and a relative differentiation otherwise.

The absolute differentiation WRT offers is shown to be the same as for RIO, when the amount of prioritized traffic is controlled below a certain limit and the relative differentiation is shown to be the same as for WRED. Thus, WRT can provide whatever differentiation RIO and WRED can offer. Moreover, end-to-end services promising an absolute differentiation most of the time and a relative differentiation as a minimum can be constructed with WRT. RIO and WRED are insufficient for creating such services.

The invention claimed is:

1. A method of active queue management, for handling prioritized traffic in a packet transmission system, the method comprising:
    providing differentiation between traffic originating from rate adaptive applications that respond to packet loss, wherein traffic is assigned to one of at least two drop precedent levels in-profile and out-profile;
    preventing starvation of low prioritized traffic;
    preserving a strict hierarchy among precedence levels;
    providing absolute differentiation of traffic; and
    reclassifying a packet of the traffic of the packet transmission system, tagged as in-profile, as out-profile, when a drop probability assigned to the packet is greater than a drop probability calculated from an average queue length for in-profile packets.

2. The method as claimed in claim 1, further comprising:
    providing absolute differentiation if a prioritized traffic is fully controlled and relative differentiation if the prioritized traffic is not fully controlled.

3. The method as claimed in claim 1 further comprising:
    discarding a packet, tagged as out-profile, when a drop probability assigned to the packet is greater than a drop probability calculated from an average queue length for out-profile packets.

4. The method as claimed in claim 3, wherein:
    a maximum threshold value for the average queue length for out-profile packets is max_th_out, a maximum threshold value for the average queue length for in-profile packets is max_th_in, and max_th_out is set to a greater value than max_th_in.

5. A telecommunications system for transmission of packet data, wherein said telecommunications system employs a method of active queue management as claimed in claim 1.

6. A telecommunications system as claimed in claim 5, wherein said telecommunications system is an internet.

7. A router for use with a telecommunications system, as claimed in claim 5, wherein said router employs the method of active queue management.

8. A method of active queue management for handling prioritized traffic in a packet transmission system, the method comprising:

providing differentiation between traffic originating from rate adaptive applications that respond to packet loss, in which packets of traffic are assigned to one of a plurality of drop precedence levels, using a modified random early detection in and out RIO to calculate RIO drop probabilities, using a load tolerant random early detection in and out ItRIO to calculate ItRIO drop probabilities, using a weighted random early detection WRED to calculate WRED drop probabilities, creating a plurality of threshold levels for an average queue length, by applying the RIO, ItRIO and WRED drop probabilities to the plurality of drop precedence levels, setting all maximum threshold levels to a same value, and reclassifying or dropping the packets of the traffic in a queue of the transmission system by using the plurality of threshold levels and the maximum threshold levels of the queue.

9. The method as claimed in claim 8, wherein, a maximum threshold value for the average queue length for in-profile packets is max_th_in, a minimum threshold value for the average queue length for in-profile packets is min_th_in, and a maximum drop probability for packets marked as in-profile is max_p_in, said method further comprising:

using a set of threshold parameters, including max_th_in, min_th_in, and max_p_in, instead of random early detection RED parameters, to determine whether an in-profile packet should be tagged as out-profile.

10. The method as claimed in claim 9, said method further comprising:

setting a plurality of maximum threshold parameters max_th#, including max_th_in and max_th_out, to a same value.

11. The method as claimed in claim 9, wherein there are three levels of drop precedence, said method further including:

calculating an average queue length for each level of drop precedence based on packets tagged with a corresponding level and packets tagged with a higher level of drop precedence.

12. The method as claimed in claim 11, further comprising:

assigning a unique threshold to each of the two highest prioritized precedence levels, said unique threshold being used to determine when a packet is to be tagged with a lower precedence level, and providing a relative differentiation among said three levels when the average queue lengths for the two highest precedence levels exceeds both thresholds.

13. The method as claimed in claim 12, further comprising:

providing more than three drop precedence levels, and employing an average queue length parameter for each drop precedence level with associated minimum threshold parameters min_th#s and maximum drop probability values max_p#s.

14. The method as claimed in claim 13, wherein there are eight drop precedence levels.

15. The method as claimed in claim 13, wherein there is a single minimum threshold th_in, for all precedence levels such that no packets are dropped if the average queue length is less than th_in.

16. A method of active queue management for handling prioritized traffic in a packet transmission system, configured to provide differentiation between traffic originating from rate adaptive applications that respond to packet loss, wherein traffic is assigned one of at least a first and second drop precedent level, namely in-profile and out-profile, said method including of:

calculating an average queue length avg_ql;

assigning minimum thresholds min_th_in and min_th_out, for in-profile packets and out-profile packets respectively, and a maximum threshold max_th;

retaining all packets with their initially assigned drop precedent levels while the avg_ql is less than, or equal to, a threshold th_in;

assigning a drop probability to each packet, determined from the average queue length;

retaining all packets while the avg_ql is less than the th_in; and dropping packets in accordance with their assigned drop probability; wherein in the assigning the drop probability to each packet, maximum drop probabilities max_p_in and max_p_out for in-profile packets and out-profile packets are not exceeded; and wherein max_p_out is greater than max_p_in, max_p_out being the maximum drop probability of packets marked as out-profile and max_p_in being the maximum drop probability for packets marked as in-profile.

17. The method as claimed in claim 16, further comprising:

applying said method to a FIFO queue.

18. The method as claimed in claim 16, further comprising:

dropping a packet if avg_ql is >max_th, when a packet arrives;

calculating an average queue length for a packet tagged as in-profile avg_ql_in, and, if avg_ql_in >th_in and min_th_in <avg_ql, calculating a probability of dropping a packet tagged as in-profile Pin and dropping or retaining said in-profile packet in accordance with a value of Pin;

calculating a probability of dropping a packet tagged as out-profile Pout if min_th_out <avg_ql, and dropping or retaining said out-profile packet in accordance with a value of Pout.

19. The method as claimed in claim 16, further comprising:

employing a plurality of drop precedence levels, greater than two, and deriving an average queue length for each drop precedence level.

20. The method as claimed in claim 18, further comprising:

setting max_th for each drop precedence level to the same value.

21. The method as claimed in claim 19, wherein there are three levels of drop precedence, further comprising:
   calculating an average queue length for each level of drop precedence based on packets tagged with the corresponding level and packets tagged with a higher level of drop precedence.

22. The method as claimed in claim 21, further comprising:
   assigning a unique threshold to each of the two highest prioritized precedence levels, said unique thresholds being used to determine when a packet is to be tagged with a lower precedence level, and
   providing a relative differentiation among said three levels when the average queue lengths for the two highest precedence levels exceeds both thresholds.

23. The method as claimed in claim 22, further comprising:
   providing more than three drop precedence levels; and
   employing an average queue length parameter for each drop precedence level with associated thresholds min_th#s and max_p#s.

24. The method as claimed in claim 23, wherein there are eight drop precedence levels.

25. The method as claimed in claim 23, wherein there is a single minimum threshold, th_in, for all precedence levels such that no packets are dropped if the average queue length is less than th_in.

* * * * *